March 26, 1929.  R. S. KIRK  1,706,615
TUBE DEFLATING MACHINE
Filed Dec. 22, 1924    5 Sheets-Sheet 1

INVENTOR
RAPHAEL S. KIRK
BY
ATTORNEY

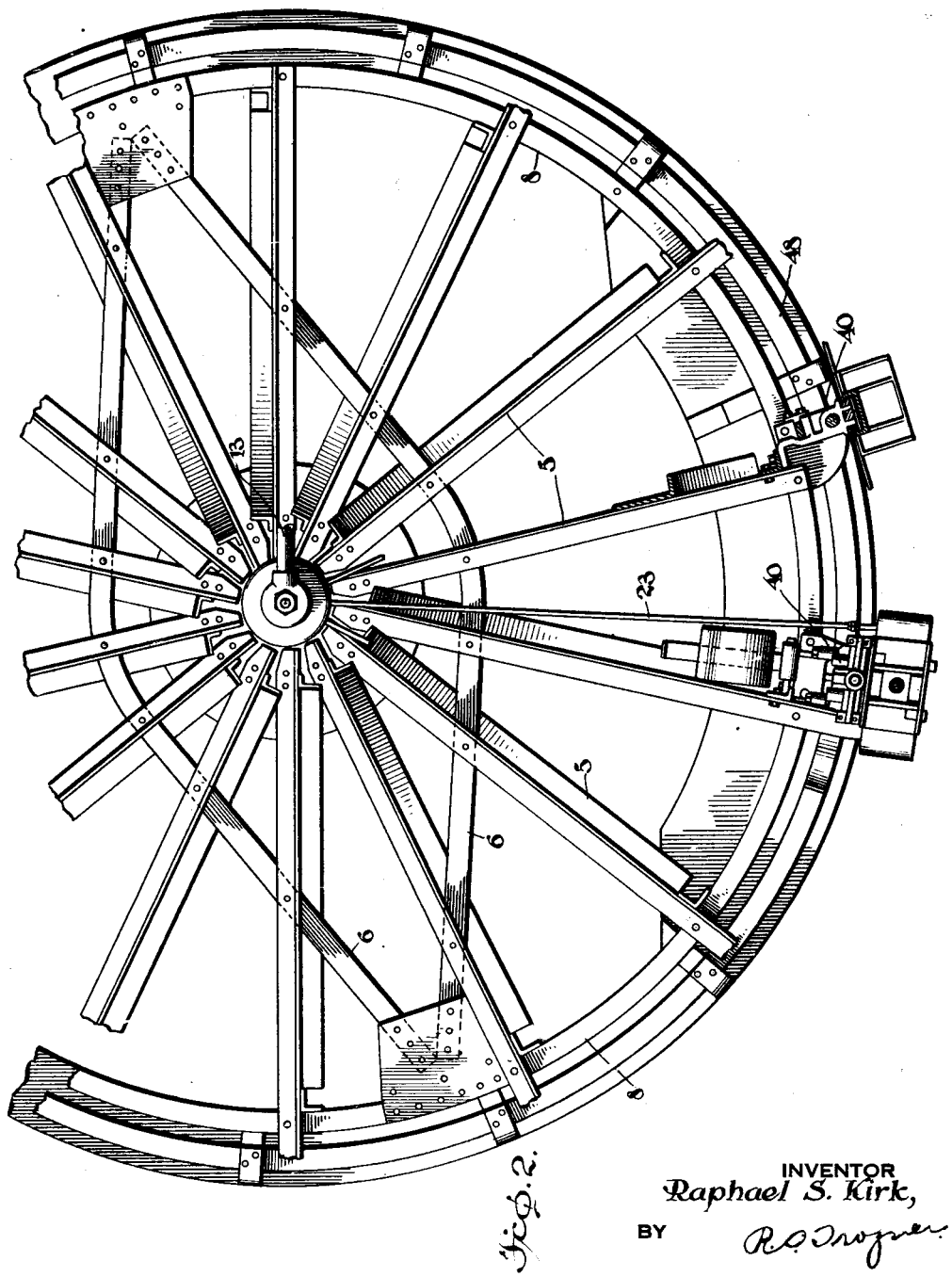

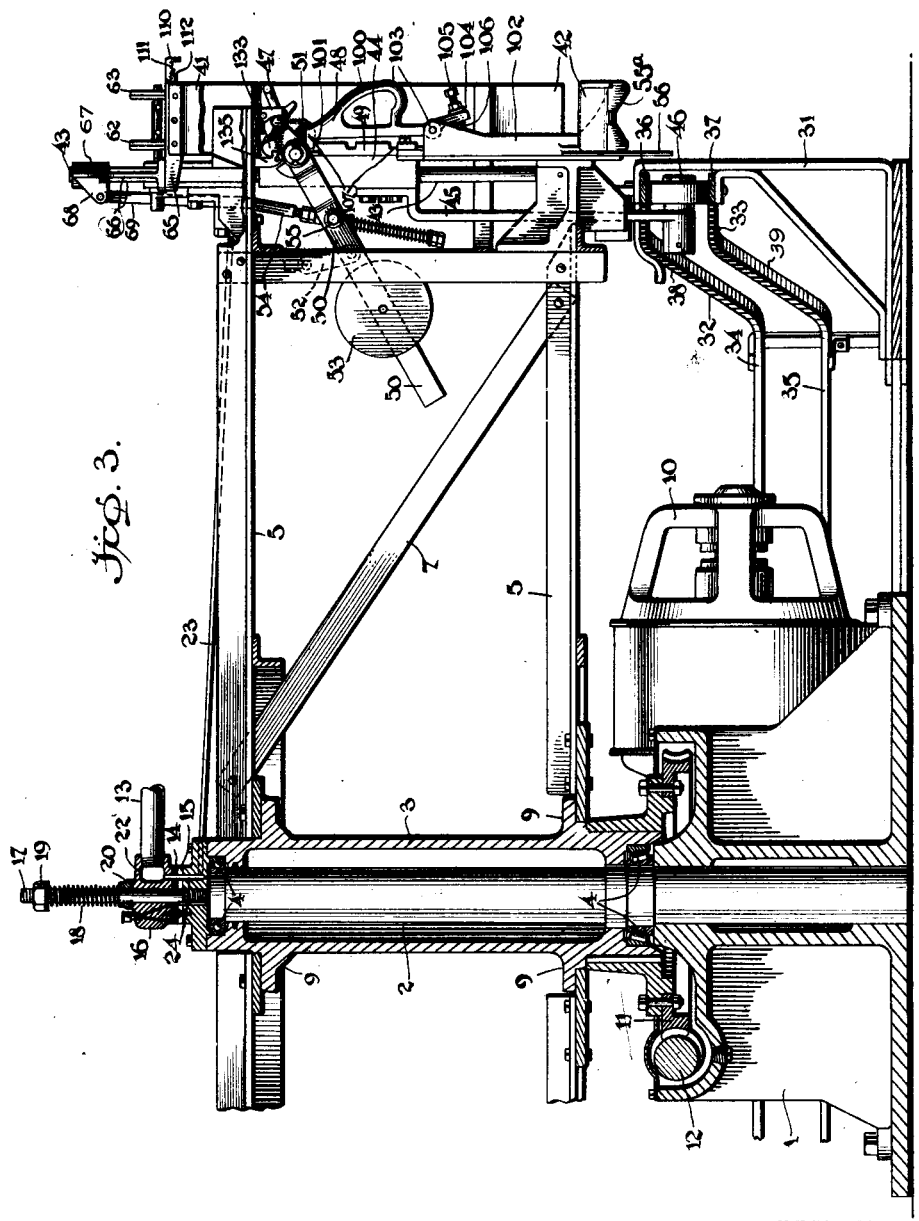

March 26, 1929.   R. S. KIRK   1,706,615
TUBE DEFLATING MACHINE
Filed Dec. 22, 1924   5 Sheets-Sheet 4
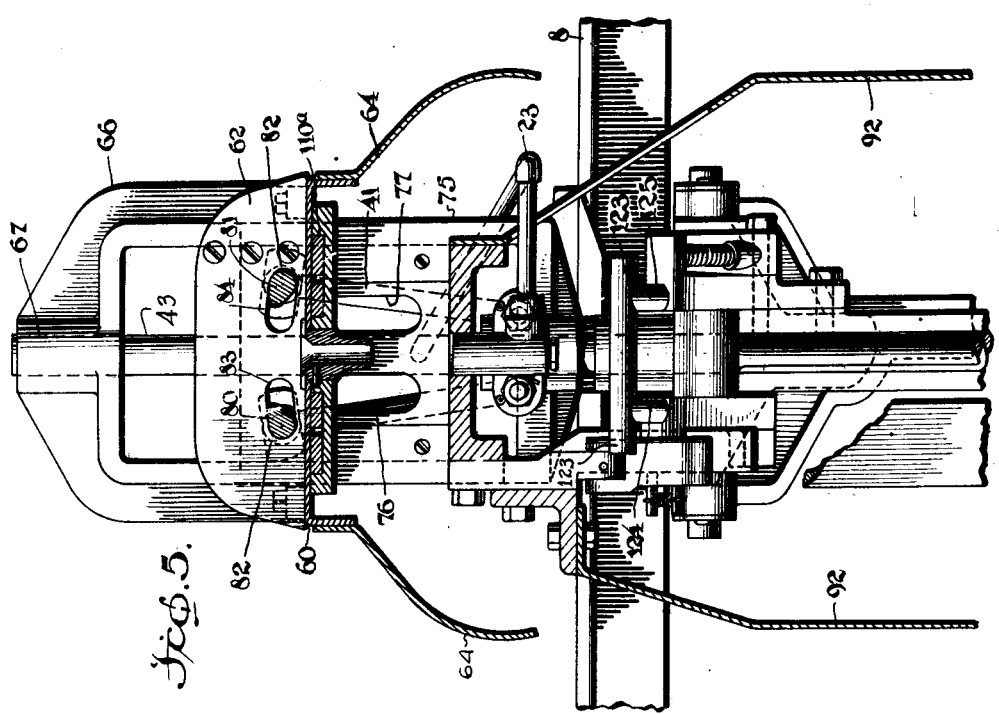
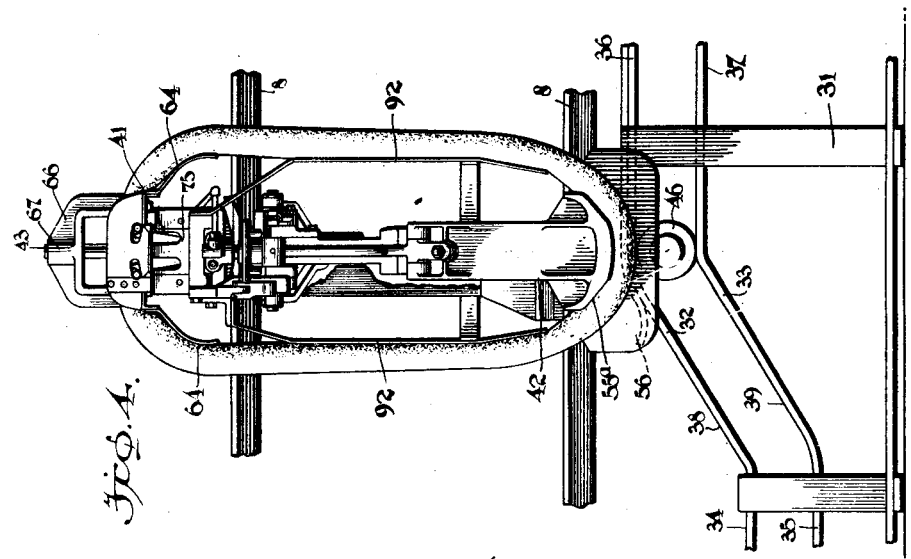
INVENTOR
Raphael S. Kirk,
BY
ATTORNEY March 26, 1929.  R. S. KIRK  1,706,615
TUBE DEFLATING MACHINE
Filed Dec. 22, 1924   5 Sheets-Sheet 5
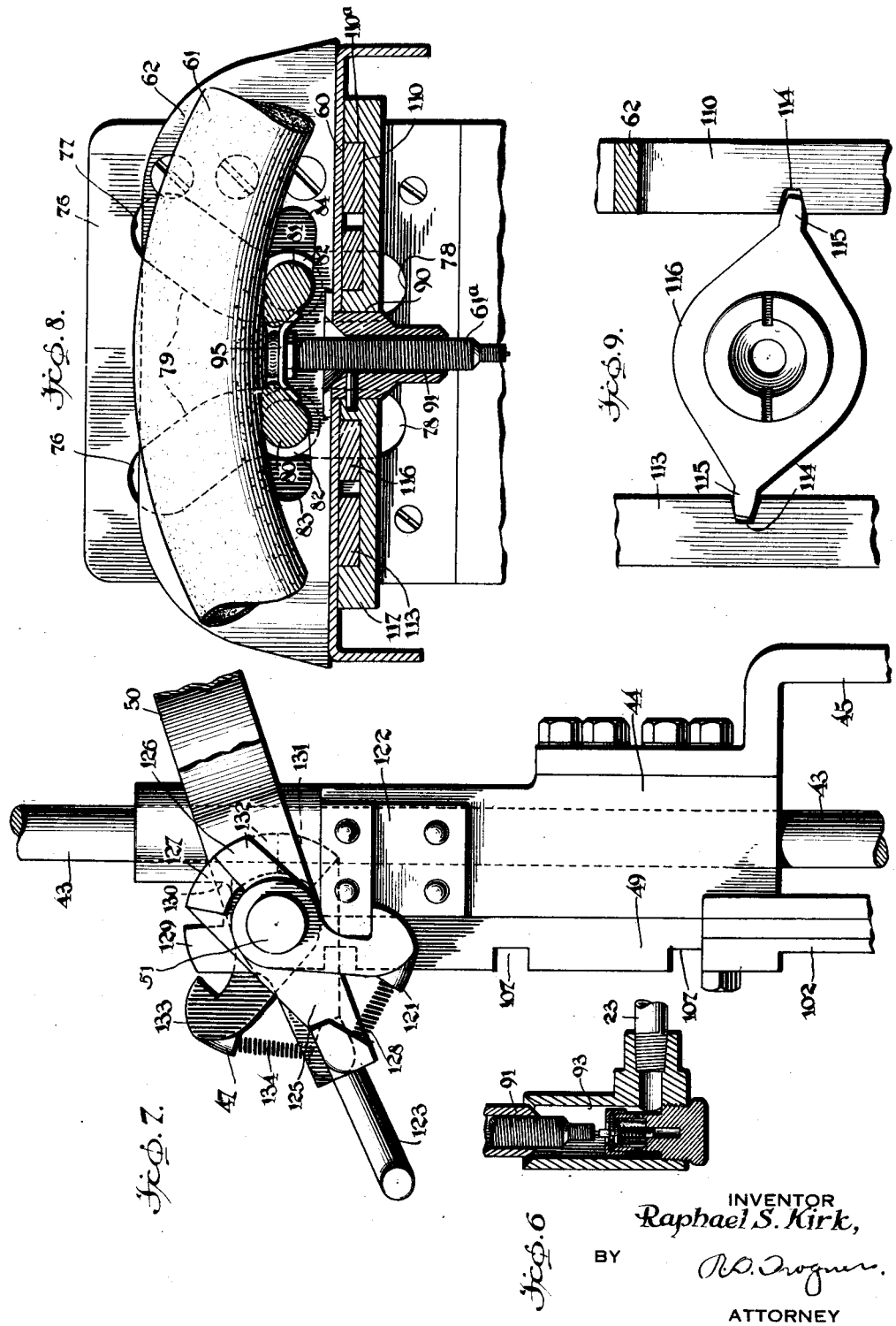

Patented Mar. 26, 1929.

1,706,615

UNITED STATES PATENT OFFICE.

RAPHAEL S. KIRK, OF AKRON, OHIO, ASSIGNOR TO THE GOODYEAR TIRE & RUBBER COMPANY, OF AKRON, OHIO, A CORPORATION OF OHIO.

TUBE-DEFLATING MACHINE.

Application filed December 22, 1924. Serial No. 757,455.

This invention relates to improvements in machines for deflating inner tubes utilized in pneumatic vehicle tires, and it has particular relation to a machine adapted to exhaust air from tubes of the character designated upon the termination of a testing period.

In the manufacture of inner tubes of the character designated it is necessary that the tubes be tested in order to insure that they are all air-tight. This test must include inflating the tubes, and allowing them to remain in an inflated condition for a suitable period of time under certain conditions. After testing, the tubes must be deflated in order that they may be suitably packed in a minimum of space for the purpose of shipping.

Heretofore, the tubes have been deflated manually, consequently each tube had to be handled separately, and as it was difficult to remove all of the air from the tubes, considerable loss of time resulted.

An object of my invention is to provide a machine which will perform the function of deflating a number of tubes simultaneously with a minimum expenditure of labor and time.

Another object of my invention is to provide a deflating machine which is operated from a source of power and provided with means whereby it is only necessary to place the inflated tubes upon the machine to secure deflation thereof automatically.

With these and other objects in view, which will be apparent as the description proceeds, reference may now be had to the accompanying drawings forming a part of this specification, in which:

Fig. 2 is a plan view of the structure illustrated in Fig. 1, portions thereof being shown in cross section and other portions being omitted for the sake of clearness;

Fig. 3 is a fragmentary vertical cross-sectional view through the center of the machine and through one of the tube supporting members;

Fig. 4 is a view in elevation of one of the tube supporting and deflating members, illustrating its relation to a cooperating cam roller track;

Fig. 5 is a cross-sectional view, on a larger scale, of the deflating mechanism of one of the tube supporting members;

Fig. 6 is a cross-sectional view in detail showing the valve construction embodied in my machine;

Fig. 7 is a detailed elevational view of a portion of the operating mechanism of the tube deflating devices;

Fig. 8 is a detail view, partially in elevation and partially in section, showing the mounting of a pneumatic tube and valve stem upon the deflating machine; and Fig. 9 is a detailed view showing the adjustments for accommodating different sizes of tubes.

Figure 1:
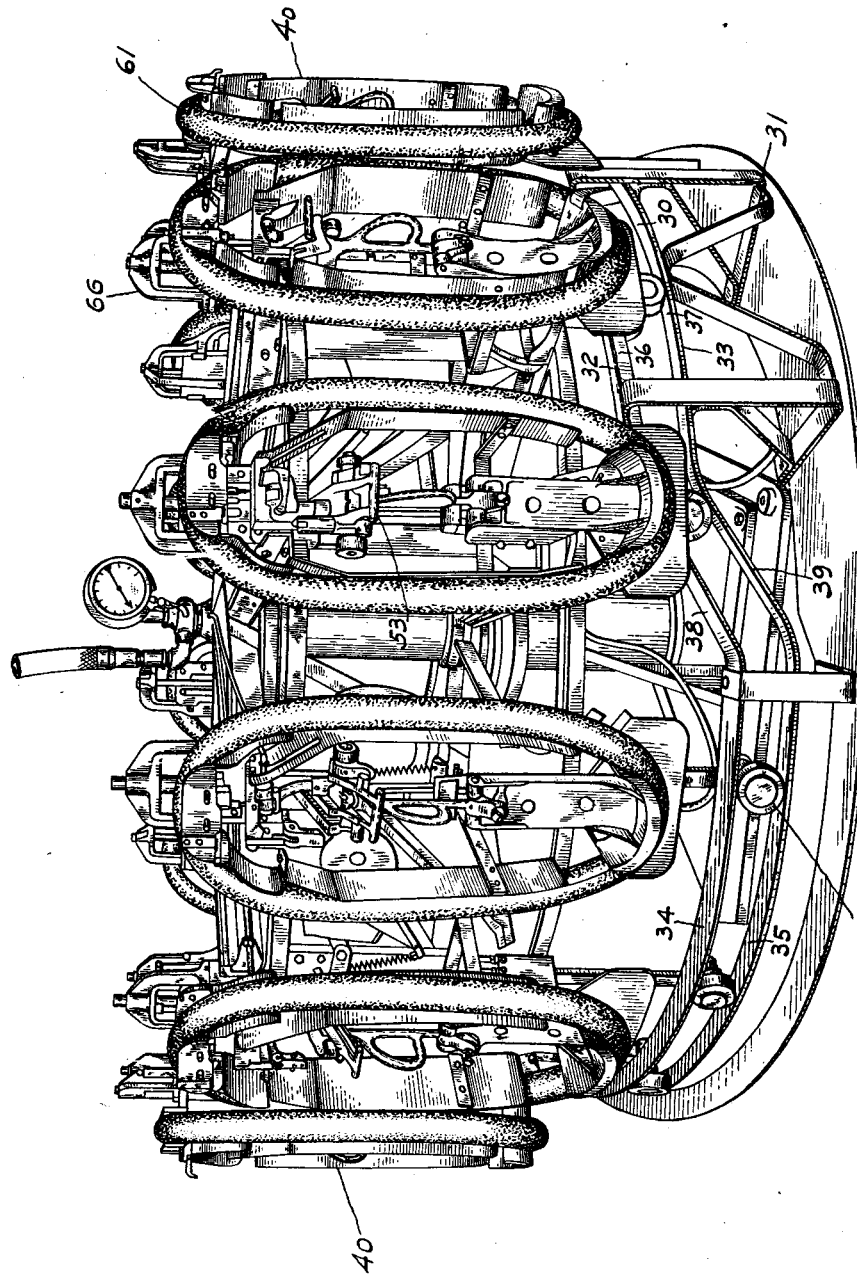
Fig. 1 is a perspective view of a complete machine constructed in accordance with my invention.

In practicing my invention, I have mounted my machine upon a base or supporting structure 1 which may be of any suitable material, such as cement or metal. A vertically disposed stationary shaft 2 is rigidly secured in any suitable manner in the support 1. A hub member 3 of cylindrical form is rotatably mounted upon the upright shaft 2 and is supported upon the base 1 and on the shaft 2 by means of two sets of roller bearings 4. The frame work of the machine is substantially circular in contour and is mounted for rotation about the shaft 2.

The rotatable frame work of the machine is composed of angle members 5 which radiate from the central supporting hub 3 and are secured to the upper and lower ends thereof by means of flanges 9. In order to reinforce the frame structure, I have provided cross members 6, as best shown in Fig. 2, and diagonally and vertically extending bracing members 7. Mounted upon the outer ends of the members 5 is a circular frame member 8. The framework, including all of the frame members and the reinforcing members are secured together in any conventional manner, such as by means of rivets. The circular framework 8 as a whole is adapted to be rotated by any convenient source of power. In this instance, I have employed a motor 10, but it is to be understood that my machine is adapted to be operated by steam or other engines without departing from the spirit of this invention. The lower portion of the hub member 3 is provided with a worm gear 11 which is operated by a worm 12, connected by suitable reducing gearing mechanism, not shown, to the motor 10. The desired rate of rotation of the frame structure may be had by installing the required gearing mechanism.

Adjacent the upper end of the hub member 3, I have secured stationary air pipe connection 13 to a hollow cap member 16. The connection 13, may, if desired, be attached to the ceiling, and communicates with any convenient form of air suction pumping mechanism, not shown. In order to secure an air-tight connection between the stationary air suction connection 13 and the relatively movable annular frame-work 8, I have provided in the member 16, two cooperating relatively movable collar members 14 and 15, which have relatively smooth surfaces that insure an air-tight connection for permitting air to be drawn from a pipe 23, connected to a tube being deflated, through a duct 24 communicating with the pipe 13. The pipe 13 is screwed into the hollow sleeve member 16, the sleeve being slidable on a vertically disposed bolt 17 secured rigidly in the top of the hub member 3. The surfaces of the collar members 14 and 15 are held in close contact by a spring 18 mounted about the bolt 17. The spring is maintained in adjusted position by means of a nut 19 mounted on the bolt in engagement with the spring. A washer 20, slidably mounted on the bolt 17 engages the lower end of the spring 18 and insures smooth operation of the member 16 with respect to the bolt 17 and the upper end of the hub member 3.

The base member 1 is provided adjacent the periphery of the supporting member 8 with an endless annular track 30 which is secured to the base member 1 and supported upon a member 31. The track member 30 consists of two arcuate track or rail members 32 and 33 disposed one above the other. The track members 32 and 33 are formed of major portions 34 and 35 respectively, disposed at a relatively low level and raised portions 36 and 37 respectively, the latter comprising but a relatively small portion of the track members. The raised portions 36 and 37 are connected at each end to the lower portions 34 and 35 by means of inclined portions 38 and 39, respectively, as best illustrated in Fig. 1.

Mounted upon the circular frame structure 8 adjacent each of the radially extending members 5 is a tube-supporting and deflating unit 40. Each of the units includes an upper tube-supporting unit 41 and a lower tube-engaging unit 42. Both of the members 41 and 42 are slidably mounted upon a supporting member 44, which, in turn, is slidably mounted upon a vertically disposed rod 43 which is rigidly mounted in the frame member 8. The member 44 is provided with a downwardly extending arm 45, the lower end of which has mounted thereon a roller member 46 that moves between the rails 32 and 33. The lower or tube-engaging unit 42 and the upper or tube supporting unit 41 are secured to the supporting member 44 by means of mechanisms 47 and 48, the latter of which is adapted to be employed for adjusting the position of the unit 41 with respect to the unit 42.

Connected to the member 44 by means of the mechanism 47 is member 49 which is pivotally connected at its upper end to a lever 50 by means of a pin 51. The lever is pivotally mounted on the frame member 8 by means of a link 52, which is pivotally connected at one end to the lever 50 and is similarly connected at the other end to the frame 8. The lever 50 is provided at its end opposite the pin 51, with balance weight 53 and is connected to the unit 41 through the agency of a rod 54, pivotally connected thereto at a point 55 intermediate the link 52 and the pin 51. The lever 50 is also connected to the unit 42 by means of the pin 51, and the mechanisms 47 and 48.

The tube engaging unit 42 comprises a tube engaging member 55ª having an arcuate surface, at the inner edge of which is provided a flange member 56 which serves to properly position a tube being deflated with respect to the member 55ª.

The upper or tube-supporting member 41 comprises a member 60 adapted to receive and support a tube 61 to be deflated, as best illustrated in Fig. 8. Adjacent the member 60 are provided flange members or guides 62 and 63 (Fig. 3) which serve to position the tube with respect to the tube-supporting member 60. Disposed adjacent the lateral edges of the member 60 are two outwardly flared guide members 64, over which the tube is placed when mounting it upon the machine. The tube-supporting unit 41 is mounted upon a member 65 which is slidably mounted upon the vertical rod 43, and includes an upright frame member 66 which in turn is provided at its upper end with a bearing member 67 slidably engaging the rod 43. The bearing member 67 is formed with a laterally extending lug 68 which is pivotally connected to the arm 50, intermediate the pivotal support thereof and the pin 51, by means of the bar 54. When the arm 50 is actuated by means of movement imparted thereto through the pin 51 by the sliding member 44, which is actuated by the arm 45, the upper or tube-supporting unit 41, is moved. Movement of the member 44 also causes movement of the unit 42, but to a greater degree than that of the member 41, because the member 42 is connected directly to the pin 51, whereas the rod 54 is connected to the lever 50 at a point adjacent its pivotal connection.

Referring to the tube-supporting unit 41, a plate 75 is rigidly mounted upon the frame member 8 and disposed within the supporting member 66. The plate 75, as best shown in Fig. 8, is provided with two spaced slots 76 and 77, the lower ends 78 of which are substantially vertical, and the upper ends 79 of which are oppositely inclined. Slidably disposed within the slots 76 and 77, are two horizontally positioned pins 80 and 81, which are secured therein by means of roller members 82, which fit snugly within the slots 76 and 77. The pins 80 and 81 also project through substantially horizontal slots 83 and 84 in the guide flanges 62, and 63 and extend over the tube-supporting member 60. As the member 41 is raised, the plate 75 remains stationary, and the pins 80 and 81, moving within the slots 76, 77, and 83 and 84 are moved apart within the slots 83 and 84 by reason of the inclination of the portions of the slots 76 and 77. In turn, when the member 41 is lowered, the inclined portions of the slots 76 and 77 cause the pins 80 and 81 to move together until they ride within the vertical portions 78 thereof.

Centrally located within the tube-supporting member 60 is an opening 90 within which is disposed a valve-receiving member 91. As best illustrated in Fig. 6, the valve-receiving member 91 is interconnected to the pipe 23. As the particular type of valve-connecting apparatus forms no part of my present invention, I have illustrated a standard connecting device, which is not described in detail.

My machine is operated by a workman standing at one side thereof adjacent the raised portions 36 and 37 of the track 30. Any suitable switching mechanism may be utilized for controlling the energization of the motor 10, but such mechanism should be placed conveniently for the operator. As the roller members 46 ride on the raised portion of the track 30, the units 41 and 42 are held in their uppermost or contracted operative positions, and a tube 61, which has been inflated for the purpose of testing for leaks, is placed upon the machine by applying the side of the tube containing the valve stem upon the member 60, inserting the valve stem 61ª of the tube within the valve-receiving member 91, and placing the lower end of the tube over the member 55ª of the unit 42. The upper portion of the tube will thus be supported by the member 60 and the supporting flanges 64, and the lower end will be engaged by the arcuate surface of the member 55ª. Disposed intermediate the units 41 and 42 are two stationary guide members 92, which are stationarily mounted upon the frame member 8 and serve to retain the tube in the desired position and protect it during the deflating operation.

The units 41 and 42 are both in their uppermost position by reason of the fact that the roller member 46, mounted upon the slidable member 44, is held in its uppermost position by being in engagement with the uppermost portion of the track member 30. As the motor 10 rotates the supporting structure 8, the roller member 46 rolls on the track member 30 between the two rails 32 and 33. When the roller member 46 reaches the inclined portions 38 and 39 of the track members, it draws the arm 45 downwardly, causing the slidable member 44 to move downwardly upon the vertical rod 43. The downward movement of the member 44 causes an equal downward movement of the unit 42, which is connected thereto through the mechanisms 47 and 48. As the slidable member 44 is connected to the member 49 through the mechanism 47, a downward movement of the member 44 causes a downward movement of the end of the lever 50 which is pivotally connected to the member 49. This operation draws the rod 54 downwardly, thus lowering the main body portion of the member 41 and causing the member 67 to slide downwardly on the vertical rod 43.

As the bearing member 67 slides downwardly, the member 65, which is connected thereto by means of the supporting member 66, slides downwardly. The pins 80 and 81, which move within the substantially horizontal slots 83 and 84 in the guide members 62 and 63, are moved inwardly so as to securely engage a member 95 constituting a portion of the valve member 61ª. As the downward movement of the member 65 is continued, the pins 80 and 81 move the valve stem 92 into the deflating valve 93. Thus, the purpose of the downward movement of the upper or tube-supporting member 41 is fulfilled.

At the same time, the tube-engaging unit 42 is moved downwardly, in order to tension or expand the tube, thus facilitating the deflation thereof, until the roller member 46 has reached the lowermost portions 34 and 35 of the track member 30. The roller member then retains the units 41 and 42 in their lowermost positions while the frame member 8 continues to rotate, during which time the tube is being deflated through the deflating valve mechanism 93. When the member 8 has nearly completed one revolution, the roller member 46 engages the inclined portions 38 and 39 of the track member 30, whereby it is again raised to the upper portions 36 and 37 of the track.

As the roller member 46 moves up the inclined rails 36 and 37, the sliding member 44 is moved upwardly on the rod 43, thus raising the tube-supporting unit 41, and the pins 80 and 81 are moved to their outermost position in the horizontal slots 83 and 84 by means of the inclined portions 79 of the slots 76 and 77 in the stationary plate 75. This movement of the pins raises the valve stem 61ᵃ from the valve-receiving member 91 and as the pins move outwardly, they release their hold upon the valve stem. In like manner, the unit 42 is raised vertically, but to a greater extent than is the unit 41, thus removing any tension from the tube and permitting the ready removal thereof from the machine. As the individual units 40, pass the operator, the deflated tube is removed and another inflated tube is placed upon the machine.

In employing my machine for deflating tubes of different wheel diameters, it is highly desirable that the relative positions of the upper tube-supporting unit 41 and the lower tube-engaging unit 42 be adjustable relative to each other. In order to provide this feature of adjustability, the mechanism 48 is provided. The mechanism 48 consists of a handle 100 which is provided with an offset lug 101 at the upper end thereof, and which is pivotally connected to the upper end 102 of the tube-engaging member 55ᵃ by means of a pin 103. The handle member 100 is formed with an integral downwardly projecting member 104 in which a set screw 105 is mounted. A compression spring 106 is disposed in engagement with said adjusting screw intermediate the members 102 and 104. The slidable member 49 is provided with a plurality of notches 107 which are adapted to receive the lug 101 of the handle 100 to secure the unit 42 in the proper relation with the slidable member 49. The set screw 105 is so adjusted that the compression of the spring 106 is sufficient to hold the lug 101 in any of the notches 107 in which it is placed.

When it is desired to employ the machine for deflating tubes of large diameter, the handle 100 is grasped and pulled outwardly and the unit 42 is permitted to fall until the notch 101 engages one of the lower notches 107 in the member 49. The machine may then be operated with the member 101 disposed within the particular notch, as the spring 106 will prevent it from leaving the desired notch. In like manner, if it is desired to employ the machine for deflating tubes of lesser diameter, the handle 100 is pulled outwardly and the member 101 raised to the desired position. If it is desired to employ the machine for but a single size of tube, the set screw 105 may be tightened to such degree as to rigidly hold the lug 101 in the desired slot. Obviously, any desired number of notches 107 may be placed in the member 44, but by experience it has been found that three such notches will very effectively serve for practically all sizes of tubes.

Also, when it is desired to inflate tubes of greater or lesser cross-sectional diameter, the spacing of the guide flanges 62 and 63 of the upper tube-supporting unit 41 may be suitably adjusted. This adjustment is effected by means of a slidable bar 110, adapted to slide longitudinally within a recess 110ᵃ in a member 117 attached to the member 60, the lower surface of bar 110 being provided with a serrated edge 111 which is engaged by means of a relatively small leaf spring 112 adapted to hold the member 110 in the desired position, as best illustrated in Fig. 3. As best illustrated in Figs. 8 and 9, the guiding flange 62 is mounted upon the bar 110 and the flange 63 is mounted on a similarly arranged bar 113, mounted on the opposite side of the valve-receiving member 91. Each of the bars 110 and 113 is provided with a notch 114 within which is disposed a projection 115 formed upon a substantially annular revolvable member 116. The member 116 and the bars 110 and 113 are mounted in the supporting structure 117. The revolvable member 116 is journaled in the member 117 in such manner that its axis coincides with that of the valve-receiving member 91.

When it is desired to increase the spacing between the members 62 and 63, the member 110 is moved inwardly, thus moving the member 62 away from the valve-receiving member 91, and through the agency of the member 116 the bar 113 is moved forwardly, thus moving the member 63 in like manner away from the valve-receiving member 91. Similarly, if the member 110 is moved outwardly, the guiding flanges 62 and 63 are caused to approach each other. By means of this mechanism, the flanges 62 and 63 are always maintained at an equal distance from the valve-receiving member 91, so as to properly center the tube therebetween.

In the event that it is desired to employ only a certain number of the tube deflating units 40, or in the event that certain of them become defective, or in any other manner are rendered useless, it is preferable to disconnect the units 41 and 42 from the actuating roller member 46, since the energy required in thus moving the members 41 and 42 is otherwise wasted. By referring to Fig. 7, it will be observed that the upper end of the notched member 49 is pivotally secured to the end of the lever 50 by means of the pin 51, and is secured to the slidable member 44, by means of the mechanism 47. The mechanism 47 comprises a hook member 121 which is adapted to cooperate with a lug 122 fastened upon the member 44 so as to cause movement of the member 49 upon movement of the slidable member 44 on the rod 43. The mechanism 47 also comprises a manually actuatable handle 123 which is pivotally mounted on the pin 51 and comprises two side portions 124 and 125, as best illustrated in Fig. 5. The hook member 121 is provided with an integral lug 126 which is retained in engagement with a lug 127 on the side portion 125 of the handle member 123 by means of a compression spring 128. When the handle 123 is raised, by means of the engagement between the lugs 126 and 127, the hook member 121, is moved out of engagement with the member 122, thus permitting relative movement of the members 49 and 44.

As the handle 123 is moved upwardly, a lug 129 rigidly secured thereto engages a surface 130 comprising a portion of the member 49, thus permitting of raising the member 49 with respect to the slidable member 44. The balancing weight 53 is so disposed upon the lever 50 that the weight of the units 41 and 42 are balanced thereby and but relatively little energy need be expended to raise the member 49. As the handle 123 is moved upwardly a lug 131 mounted thereon on the opposite side of the pin 51 moves downwardly, thus permitting a lug 132, constituting a portion of a hook member 133, to move therewith. The hook member 133 is held in spaced relation with the handle member 123 by means of a compression spring 134, which serves to retain the lug 132 in engagement with the lug 131. When the member 49 is raised to its uppermost position, the hook member 133 engages a suitable catch 135 mounted on upper portion of the frame member 8, thus securing the member 49 in that position with the units 41 and 42 retained in their uppermost position, and disconnected from the member 44, permitting a free movement of the slidable member 44 with respect thereto.

In order to disconnect the member 49 from the catch member 135, the handle 123 is moved downwardly, thus causing the lug 131 mounted thereon to move the lug 132 upwardly. This causes the hook member 133 to be so rotated as to move out of engagement with the catch member 135, permitting the operator to move the member 49 and the lever 50 downwardly until the hook member 121 engages the cooperating member 122, mounted on the slidable member 44. In the structure illustrated in Fig. 5, and in Fig. 3, the member 49 is shown raised in its uppermost or inoperative position.

Although I have illustrated but one form which my invention may assume, and have described in detail but a single application thereof, it will be apparent to those skilled in the art, that it is not so limited, but that various minor modifications and changes may be made therein without departing from the spirit of my invention or from the scope of the appended claims.

What I claim is:

1. A machine comprising a movable structure for supporting a tube and means controlled by the movement of the structure for deflating the tube.

2. A machine comprising relatively movable structures, means for expanding a tube on one of the structures, and means actuated by relative movement between the structures for operating the first mentioned means intermittently.

3. A machine comprising a rotatable structure, tube deflating elements actuated by the rotation of the structure, and means for selectively securing the elements in inoperative position.

4. A machine comprising a rotatable structure including members radiating from a central support and means controlled by the rotative movement of the structure associated with said members for automatically deflating pneumatic tubes.

5. A machine comprising a rotatable structure including members mounted upon a central support, means for supporting pneumatic tubes on said members and means controlled by the rotative movement of the structure for deflating said tubes at predetermined points in the rotative movement of the structure.

6. A deflating mechanism comprising an expansible element adapted to support a tube having a valve stem therein, means for clampingly engaging the stem and a resilient member operatively associated with the element and with the means to yieldably control the operation of the latter.

7. A machine comprising a rotatable structure including members radiating from a central support, means for supporting a pneumatic tube on each of said members and means controlled by the rotative movement of the structure for alternately stretching said tube and releasing it from stretched position at predetermined points during the rotation of the structure.

8. A machine comprising a rotatable structure including members radiating from a central support, said members being provided with expansible frame elements adapted to have an inflated pneumatic tube disposed thereabout in encircling relationship, means controlled by the rotative movement of the structure for automatically deflating said tubes and means for expanding and contracting said frame elements.

9. A machine comprising a rotatable structure including members radiating from a central support, expansible frame elements adapted to support pneumatic tubes carried by said members, means for deflating said tubes and means controlled by the rotative movement of the structure for alternately expanding and contracting said frame elements at predetermined points in the path of their rotative movement.

10. A machine comprising a centrally mounted frame adapted to be rotated from a source of power, a pneumatic tube deflating mechanism mounted upon said structure including relatively movable elements, a movable roller secured to one of said elements and means cooperating with the roller to move the same whereby the said elements are relatively moved.

11. A machine comprising a centrally mounted frame adapted to be rotated from a source of power, pneumatic tube deflating mechanism mounted upon said structure including a plurality of relatively movable elements, a roller member secured to one of said elements and means adapted to actuate said roller whereby the elements are alternately moved toward and away from each other.

12. A machine comprising a centrally mounted frame adapted to be rotated from a source of power, an expansible tube deflating mechanism mounted upon the structure, a roller member secured to the mechanism and a track having portions of relatively different heights against which the roller operates whereby said mechanism is automatically caused to alternately expand and contract during the rotative movement of the frame.

13. A machine comprising a centrally mounted frame adapted to be rotated from a source of power, expansible mechanism adapted to support and tension pneumatic tubes arranged at intervals about the periphery of said frame, means controlled by rotative movement of the frame associated with the mechanism for automatically gripping and holding the valve stems of said tubes during deflection thereof.

14. A machine comprising a mechanically driven rotatable structure, expansible elements carried by said structure adapted to support pneumatic tubes, means for automatically expanding said elements and means for maintaining said elements in expanded position.

15. A machine comprising a mechanically driven rotatable structure, expansible elements carried by said structure adapted to support pneumatic tubes, means for automatically expanding said elements and means for securing said elements in expanded position during a part of the rotating movement of the structure.

16. A machine comprising a mechanically driven rotatable structure, expansible elements carried by said structure adapted to support pneumatic tubes, means for automatically expanding said elements, means for automatically securing said elements in expanded position and means for automatically releasing said elements from said position.

17. A machine comprising a mechanically driven rotatable structure, expansive elements carried by said structure adapted to support pneumatic tubes, means for expanding the elements, means controlled by the rotative movement of the structure for gripping the valve stem of the pneumatic tubes and means for moving the valve stem into operative communication with an air exhausting mechanism to effect deflation of said tubes.

18. A machine comprising a rotatable structure connected to a source of power expansible elements including a member secured to the upper part of the rotatable structure, a relatively movable member slidable on a rod rigidly secured to the rotatable structure, a guide for a pneumatic tube mounted upon the first named member, two pins extending across said guide, and a block provided with inclined slots rigid with the rotatable member, the slots and pins cooperating to grip the valve stem of a pneumatic tube when the elements are expanded.

19. A machine comprising a structure journalled upon an upright shaft, a plurality of tube supporting elements provided with deflating mechanisms carried by said structure, and a track disposed adjacent the structure cooperating with the supporting elements to operate the deflating mechanisms.

20. A machine comprising a circular structure having a central upright bearing member, a plurality of tube supporting elements provided with deflating mechanisms carried by said structure and an annular track member disposed adjacent the structure and concentrically therewith cooperating with the supporting elements to operate the deflating mechanisms.

21. A machine comprising a circular structure having a central upright bearing member, a plurality of tube supporting elements provided with deflating mechanisms carried by said structure and a track disposed adjacent the structure provided with portions disposed at different elevations cooperating with the supporting elements to operate the deflating mechanisms.

22. A machine comprising a circular structure having a central upright supporting means, a plurality of tube supporting elements provided with deflating mechanisms carried by said structure, a track operatively associated with the deflating mechanisms disposed adjacent the structure concentrically therewith and provided with portions disposed at different elevations, inclined sections connecting said portions and means for relatively moving the structure and the track to operate the deflating mechanisms.

23. A tube tensioning mechanism comprising two oppositely disposed members for supporting a tube, a support for the members, and means for moving the members with respect to the support, in the same direction at different speeds.

24. A tube deflating mechanism comprising a support, including a guide rod, two members slidable toward and away from each other on said guide rod and adapted to support a tube in encircling relationship thereabout, a deflating valve associated with said members, and means for moving said members relatively to tension said tube and to cause contact between the valve stem of the tube and said deflating valve.

25. A tube deflating mechanism comprising a support, including a guide rod, two members slidable in opposite directions upon said guide rod, a lever and weight mechanism pivotally connected to one of said members, and to the support and adapted to cause movement of the members on said rod and means for supporting a tube on said members, said tube being tensioned and deflated when the members move in a direction away from each other.

26. A tube deflating mechanism comprising a support, an upper member and a lower member adapted to be moved in the same direction but to different degrees, means for supporting a tube about said members, a plurality of pins disposed in the upper member and means adjacent the upper member cooperating with the pins to move the latter toward each other to grip the valve stem of the tube as the upper member moves in one direction.

27. A tube deflating mechanism comprising a support including a rod, an upper member and a lower member slidable in opposite directions on said rod, said lower member comprising two elements normally adapted to be moved as a unit, means for detachably securing said elements together, manually operated means for disengaging the securing means, means for supporting a tube about said members, and means for deflating said tube.

28. A tube deflating mechanism comprising a support including a rod, an upper member and a lower member slidable in the same direction but to different degrees on said rod, said lower member comprising two elements normally adapted to be moved as a unit, means for detachably securing said elements together, manually operated means carried by one of the elements for disengaging the securing means, said manually operated means being provided with a member adapted to hook over a portion of the support to secure the upper and lower members in inoperative position.

In witness whereof, I have hereunto signed my name.

RAPHAEL S. KIRK.